No. 764,085. PATENTED JULY 5, 1904.
W. WALTON.
ANIMAL TRAP.
APPLICATION FILED APR. 2, 1904.
NO MODEL.

Witnesses:
Jas. C. Wobusmith.
Wilhelm Vogt.

Inventor:
William Walton,
By J. Walter Douglass
Attorneys.

No. 764,085.

Patented July 5, 1904.

UNITED STATES PATENT OFFICE.

WILLIAM WALTON, OF ATLANTIC CITY, NEW JERSEY.

ANIMAL-TRAP.

SPECIFICATION forming part of Letters Patent No. 764,085, dated July 5, 1904.

Application filed April 2, 1904. Serial No. 201,232. (No model.)

*To all whom it may concern:*

Be it known that I, WILLIAM WALTON, a citizen of the United States, residing at Atlantic City, in the county of Atlantic and State of New Jersey, have invented certain new and useful Improvements in Animal-Traps, of which the following is a specification.

My invention has relation to a small-animal trap for caging or entrapping the animal without torturing the same; and in such connection it relates to the construction and arrangement of the trap.

The principal objects of my invention are, first, to provide a small-animal trap for caging and entrapping the animal without torturing the same, and, second, to provide a trap of the character described with a transparent pivotally-suspended flap adapted to close the entrance to the body of the trap from an inclined plane and stage extending from the open end of the trap into the body or bait-supporting chamber of the trap adapted to cage or entrap the animal.

My invention, stated in general terms, consists of an animal-trap constructed and arranged in substantially the manner hereinafter described and claimed.

The nature and characteristic features of my invention will be more fully understood from the following description, taken in connection with the accompanying drawings, forming part hereof, in which—

Figure 1:
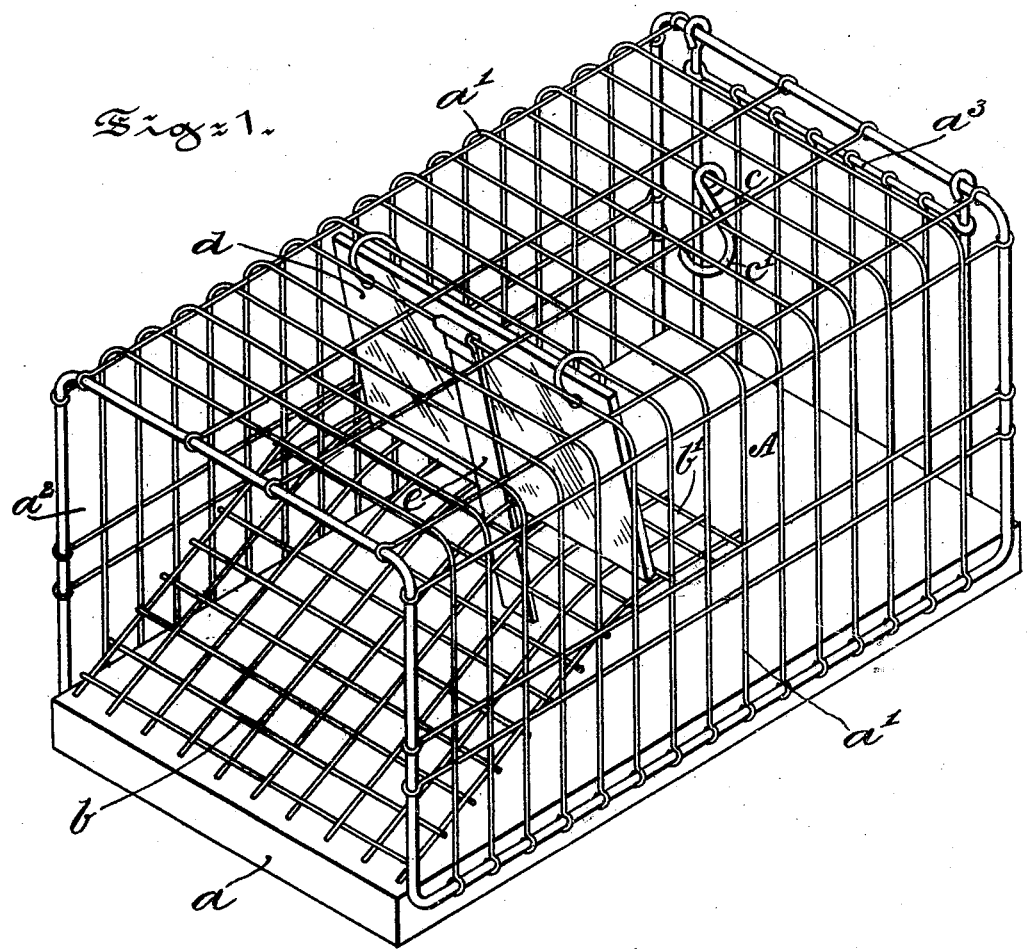
Figure 2:
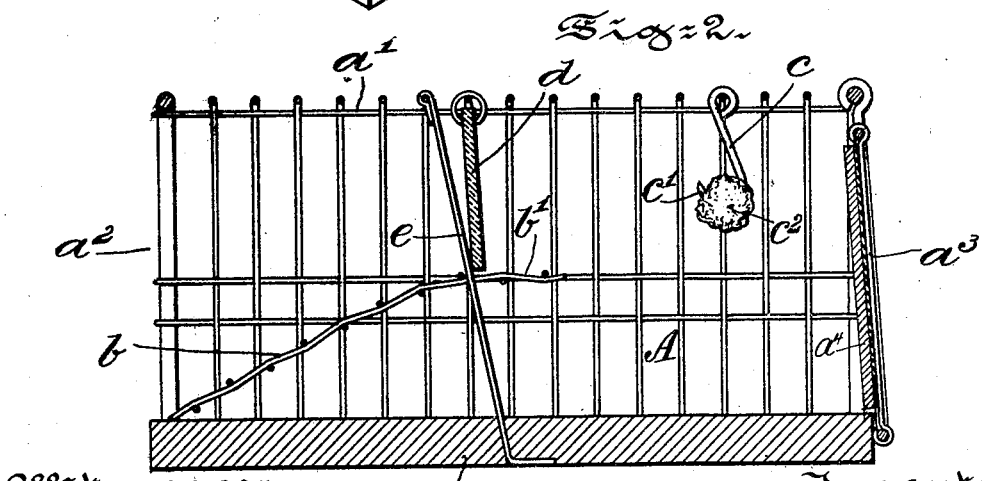

Figure 1 is a perspective view of an animal-trap embodying main features of my invention, and Fig. 2 is a longitudinal central sectional view of the trap of Fig. 1.

Referring to the drawings, $a$ represents an oblong base of the trap provided with a meshed-wire cage $a'$, suitably fitted and secured to the base, having one end open at $a^2$ and the opposite end closed by a snap or other type of door $a^3$. On the inner side of the door $a^3$ is suitably arranged a piece of looking-glass or the like $a^4$, as shown in Fig. 2, to attract and entice the animal from the open end of the trap into the body of the trap, to be hereinafter more fully explained. From the open end $a^2$ and extending into the interior of the cage is an inclined meshed-wire platform $b$, terminating in a horizontal plane or stage $b'$. This inclined platform $b$ is held in required position by the base $a$ and sides of the cage $a'$.

$c$ is a pivotal hook supported from the top of the cage $a'$ and provided with a loop or eye $c'$, in which is supported the bait $c^2$ to attract the animal into the body or bait-supporting chamber A of the cage.

$d$ is a glass or other transparent flap pivotally suspended from the top of the cage $a'$ and normally closing the entrance from the inclined platform $b$ to the body or bait-supporting chamber A of the cage. The normal position of the flap $d$ in its suspended condition is at about the point where the inclined portion of the platform $b$ merges into the horizontal stage of plane $b'$ thereof adjacent to the body or bait-supporting chamber A of the cage. The range of to-and-fro movement of the flap is controlled by the vertical strip or rod $e$, secured to the top of the cage and extending, preferably, in an inclined position through the platform to the base of the cage. The transparent flap $d$ is so suspended as to deceive the animal, and thus by the eagerness of the animal to reach the suspended bait beyond it is entrapped within the body A of the cage and without being in any manner tortured in the entrapping. Moreover, the looking-glass disposed on the inner side of the rear door of the cage serves to entice the animal into the body of the trap.

Having thus described the nature and objects of my invention, what I claim as new, and desire to secure by Letters Patent, is—

1. An animal-trap, comprising a cage having a closed end and an open end, an inclined platform leading from the open end into the body of the cage, and a transparent flap suspended within the cage between the platform and body or bait-supporting chamber of the cage, substantially as and for the purposes described.

2. An animal-trap, comprising a cage having a closed end and an open end, an inclined platform leading from the open end into the body of the cage and terminating in a horizontal plane or stage, and a pivotal transparent flap located between the inclined and horizontal portions of said platform, substantially as and for the purposes described.

3. An animal-trap, comprising a cage having a closed end and an open end, an inclined platform secured to the base and sides of the cage and leading from the open end into the body of the cage and terminating in a horizontal plane or stage, and a transparent flap normally closing the entrance from said platform to the body of said cage, substantially as and for the purposes described.

4. An animal-trap, comprising a cage having an attracting-door at one end and an open opposite end, an inclined platform with an extension or stage, said platform extending from the open end of the cage to the bait-supporting chamber of the trap, a pivotal device with a hook or eye for suspending bait within said chamber, and a transparent flap pivotally supported above said platform and normally closing the space between said platform and the body of said cage, substantially as and for the purposes described.

In testimony whereof I have hereunto set my signature in the presence of two subscribing witnesses.

WILLIAM WALTON.

Witnesses:
DANIEL B. TAYLOR,
I. MORTON ADAMS.